US008677363B2

(12) United States Patent
Yoshida

(10) Patent No.: US 8,677,363 B2
(45) Date of Patent: Mar. 18, 2014

(54) METHOD FOR MANAGING, TRACKING AND DISTRIBUTING JOB PROGRAMS FOR PROCESSING TO A PLURALITY OF EXECUTION COMPUTERS

(75) Inventor: Taketoshi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1266 days.

(21) Appl. No.: 12/041,156

(22) Filed: Mar. 3, 2008

(65) Prior Publication Data

US 2008/0229315 A1 Sep. 18, 2008

(30) Foreign Application Priority Data

Mar. 15, 2007 (JP) ................................ 2007-067426

(51) Int. Cl.
*G06F 9/46* (2006.01)
(52) U.S. Cl.
USPC .......................................... 718/102; 718/100
(58) Field of Classification Search
None
See application file for complete search history.

(56) References Cited

U.S. PATENT DOCUMENTS

| | | | | |
|---|---|---|---|---|
| 5,473,749 | A * | 12/1995 | Ito et al. ......................... | 345/505 |
| 5,845,082 | A | 12/1998 | Murakami | |
| 6,467,045 | B2 * | 10/2002 | Takeda ........................... | 714/5.1 |
| 7,881,957 | B1 * | 2/2011 | Cohen et al. ........................... | 1/1 |
| 2002/0007394 | A1 * | 1/2002 | Bertolus et al. ............... | 709/204 |
| 2003/0204576 | A1 * | 10/2003 | Yamada et al. ............... | 709/220 |
| 2004/0006611 | A1 * | 1/2004 | Yi ................................... | 709/222 |
| 2004/0010490 | A1 * | 1/2004 | Mikami et al. ..................... | 707/3 |
| 2006/0015875 | A1 * | 1/2006 | Ishihara et al. ............... | 718/102 |
| 2006/0059489 | A1 * | 3/2006 | Koyanagi ....................... | 718/100 |
| 2006/0178848 | A1 * | 8/2006 | Ilzuka et al. ..................... | 702/63 |
| 2006/0294507 | A1 * | 12/2006 | Buskens et al. ............... | 717/133 |
| 2007/0050564 | A1 * | 3/2007 | Gunna et al. ................... | 711/146 |
| 2007/0150961 | A1 * | 6/2007 | Ikeda et al. ....................... | 726/27 |
| 2007/0233870 | A1 * | 10/2007 | Goto et al. ..................... | 709/226 |
| 2008/0256542 | A1 * | 10/2008 | Kurata .......................... | 718/102 |

FOREIGN PATENT DOCUMENTS

JP A 8-110895 4/1996
JP 2004-127309 4/2004

OTHER PUBLICATIONS

Japanese office action issued in corresponding Japanese App. No. 2007-067426, dated Jan. 31, 2012.

* cited by examiner

*Primary Examiner* — Thomas Lee
*Assistant Examiner* — Aurel Prifti
(74) *Attorney, Agent, or Firm* — Greer Burns & Crain Ltd.

(57) ABSTRACT

A method for controlling a distributed processing system comprising a management computer for managing distributed processing of a job program and a plurality of execution computers for executing the job program, includes dividing the job program into a plurality of jobs and the management computer assigning the plural jobs among the execution computers, transferring processed information obtained by executing said jobs program by each of the execution computers to the management computer, storing processed information corresponding to the executed job program into the execution computers, and re-executing the job program on said management computer by using the processed information when the processed information is available.

11 Claims, 16 Drawing Sheets

FIG. 6

| Job Program Name | Job Program ID | Job Program Storing-position | Indicating Of Reproducibility | Identification Number Of The Management Computer |
|---|---|---|---|---|
| | | | | |
| | | | | |
| | | | | |
| | | | | |
| | | | | |

FIG. 7

| Job ID (141) | Processing contents (142) | Processing Computer (143) | Processing situation (144) | link (145) | priority (146) | Processing Result (147) |
|---|---|---|---|---|---|---|
|  |  |  |  |  |  |  |
|  |  |  |  |  |  |  |
|  |  |  |  |  |  |  |
|  |  |  |  |  |  |  |

FIG. 9

| Job Program ID | Job ID | Identifier Of The Management Computer | Job Start/End Time | Processing Result |
|---|---|---|---|---|
| | | | | |
| | | | | |
| | | | | |

151, 152, 153, 154, 155, 150

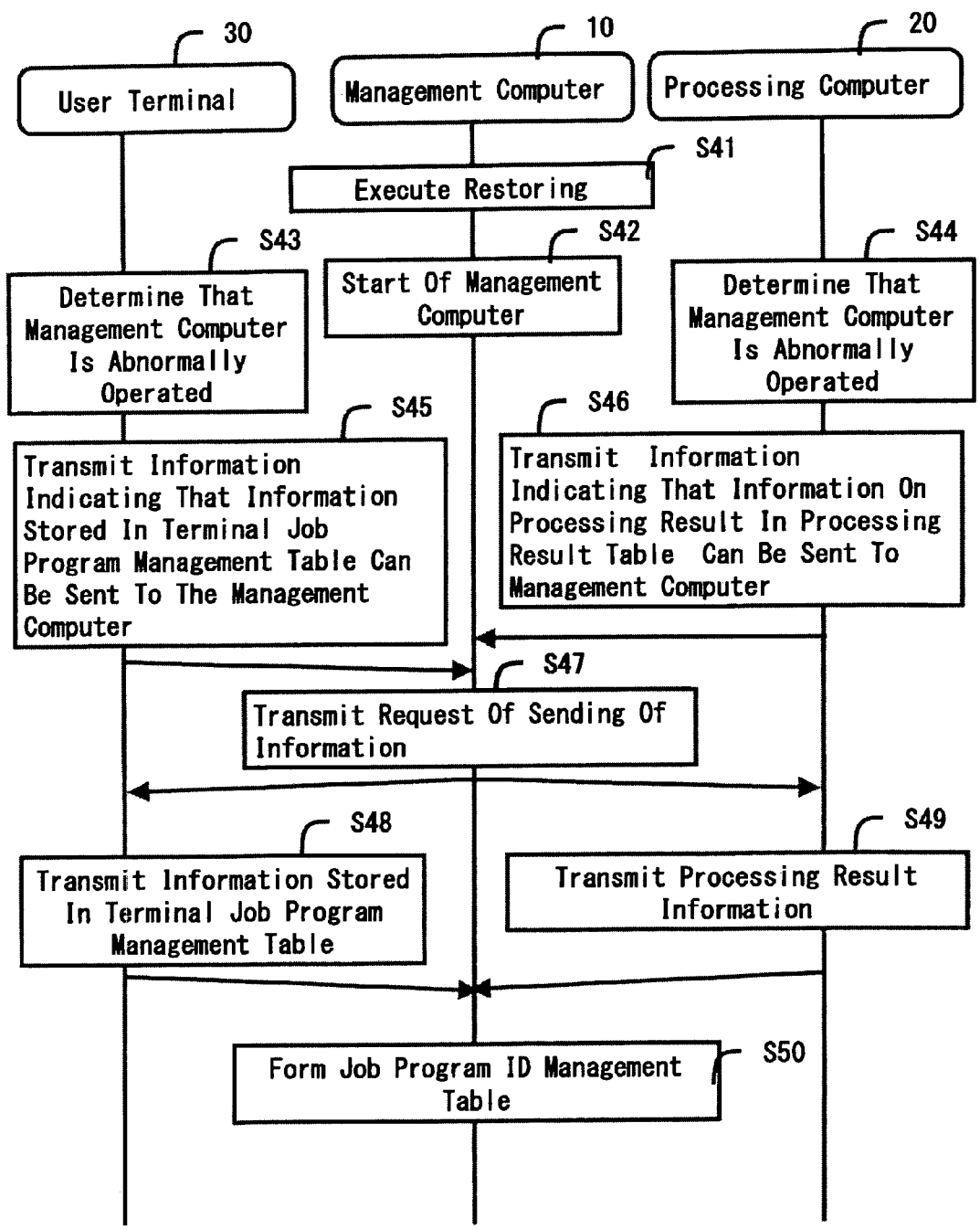

METHOD FOR MANAGING, TRACKING AND DISTRIBUTING JOB PROGRAMS FOR PROCESSING TO A PLURALITY OF EXECUTION COMPUTERS

TECHNICAL FIELD

The present disclosure relates to a data management method of a distributed processing system.

In distributed processing, a plurality of computers are connected to each other, and a processing is executed by the plurality of computers. In a distributed processing system, a management computer divides the processing given from a user terminal into a plurality of minimum units (hereinafter, referred to as a job). The management computer distributes the plurality of jobs among the processing computers, and enables the processing computers to execute processing corresponding to the jobs in a distributed manner. The management computer stores job management information into a storage device included in the management computer, against the occurrence of failures.

However, since the management computer stores job information to a storage device, such as a magnetic disk device, every job, a storage time is required. As a consequence, the delay in processing is caused by time for storing the job information to the storage device by the management computer in the distributed processing system. On the other hand, if the management computer does not store the job information, there is a danger that information on the processing can be lost when the management computer is abnormally operated in halfway of a series of processing.

As another method, there is a method using the management computer having a redundant structure or a method using the management computer having a storage device with the redundant structure. However, the redundant structure causes a problem for greatly increasing costs for system structure. Further, the control is required between the management computers having the redundant structure, and there is thus a program that the processing of the distributed processing system is complicated and the operation of the distributed processing system is unstable. Furthermore, since the progress of the processing needs to be stored, there is a problem that the load of the management computer is not improved.

SUMMARY

According to an aspect of an embodiment, a method for controlling a distributed processing system comprising a management computer for managing distributed processing of a job program and a plurality of execution computers for executing a plurality of jobs, comprising: dividing a request of processing of the job program into a plurality of jobs by the management computer; assigning said jobs from said management computer to said execution computers; transferring processed information obtained by said jobs by said execution computers to said computer; storing said processed information executing management into said execution computer; and resuming dividing a request of processing of the job program and assigning the jobs to said execution computers by management computer, wherein assignment of the jobs is arranged such that at least one of the jobs for which the processed information stored is available is omitted from assignment.

BRIEF DESCRIPTION OF THE DRAWINGS

FIG. 6 is a diagram showing the structure of a job program ID management table according to the embodiment.

FIG. 7 is a diagram showing an example of the structure of a job information table according to the embodiment.

FIG. 9 is a diagram showing an example of the structure of a processing result table according to the embodiment.

FIG. 14 is a flowchart of processing for restoring data on a processing request on a memory in the management computer according to the embodiment.

DESCRIPTION OF THE PREFERRED EMBODIMENTS

Accordingly, it is an object of the present disclosure to provide a distributed processing system in which it is possible to suppress the load of a management computer due to processing for storing a processing target of distributed processing and to also reduce processing required for restoration of a failure of the management computer.

The present disclosure relates to a distributed processing system, in which a processing computer operates an operation target transmitted from the management computer that manages distributed processing and the processing computer allows the management computer to execute distributed processing for transmitting the operation result. With first means according to the present disclosure, the processing computer receives the operation target from the management computer, and selectively stores results of the operation target having the same result as that upon re-operating the operation target.

With second means according to the present disclosure in addition to the first means, upon detecting the occurrence of abnormality in the management computer, information that can transmit the result of the operation target having the same result as that upon re-operating the operation target is sent to the management computer.

With third means according to the present disclosure in addition to the first means, upon receiving information indicating that the result of the operation target having the same result as that upon re-operating the operation target may be deleted from the management computer, the result of the operation target having the same result as that upon re-operating the operation target is deleted.

With fourth means according to the present disclosure, when the management computer transmits an operation target added with an identifier every divided operation target to a processing computer and information on the distributed processing of the management computer is lost in halfway of the distributed processing, the result of the operation target having the same result as that upon re-operating the operation target is received from the processing computer.

According to the present disclosure, a processing computer and a user terminal store information necessary for distributed processing.

Therefore, processing for storing the information on the distributed processing of the management computer to the storage device is not required, thereby reducing the load of the management computer. Further, since the processing computer selectively stores the result of the operation target having the same result as that upon re-operating the operation target, processing for restoring the result of the operation target having the same result as that upon re-operating the operation target is reduced.

Hereinbelow, an embodiment of the present disclosure will be described.

Figure 1:
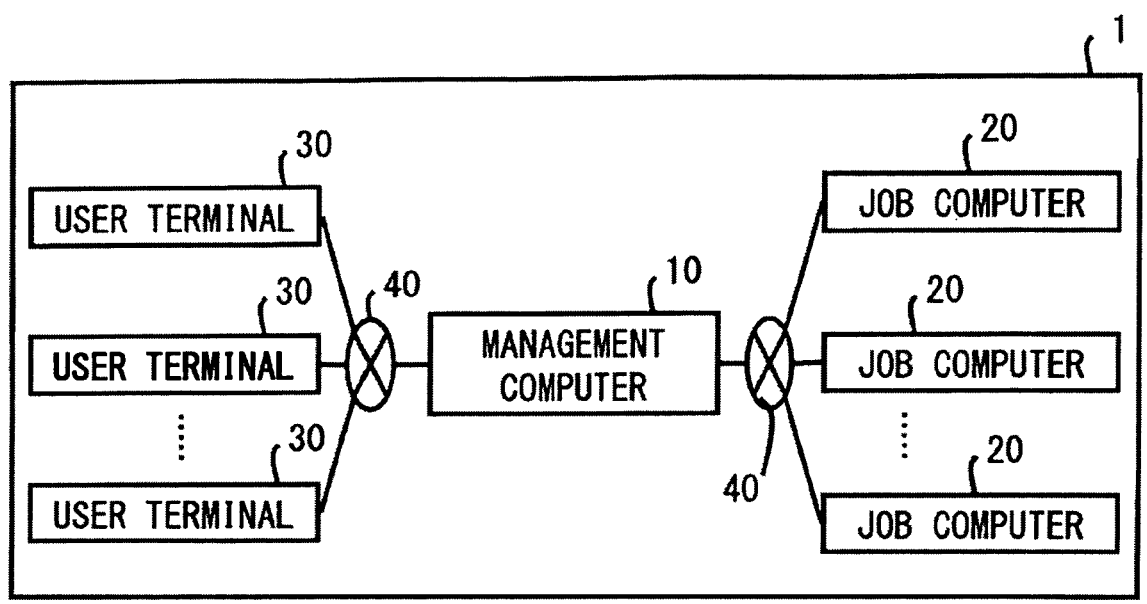
FIG. 1 is a diagram showing the system structure of a distributed processing system according to an embodiment.

FIG. 1 is a diagram showing the system structure of a distributed processing system 1 according to the embodiment. The distributed processing system 1 according to the embodiment comprises a management computer 10, a plurality of JOB computers (execution computers or processing computers) 20, and a plurality of user terminals 30, and these elements are connected via a network 40.

The management computer 10 manages processing that is executed by the plurality of JOB computers 20 via the network 40. One collecting processing request registered from a user is received by the user terminals 30. The user terminal divides the received processing request every processing executed by the individual processing computers 20. The processing divided to be executed by the individual processing computers 20 is called a job. The management computer 10 manages the processing request and the individual divided processing. The management computer 10 assigns jobs to processing computers 20.

The processing computers 20 individually have processing capacities. The processing capacity is determined by the hardware structure, such as the performance of a CPU included in the processing computer 20, a memory capacity, and a storage capacity, OS, and the ratio of the processing capacity assigned upon executing the job. The individual processing computers 20 on the distributed processing system 1 have different processing capacities. The processing computer 20 sends the result of executing the job operation to the management computer 10.

The user terminal 30 receives the processing request from a user. The user terminal 30 transmits the processing request to the management computer 10 via the network 40.

Figure 2:
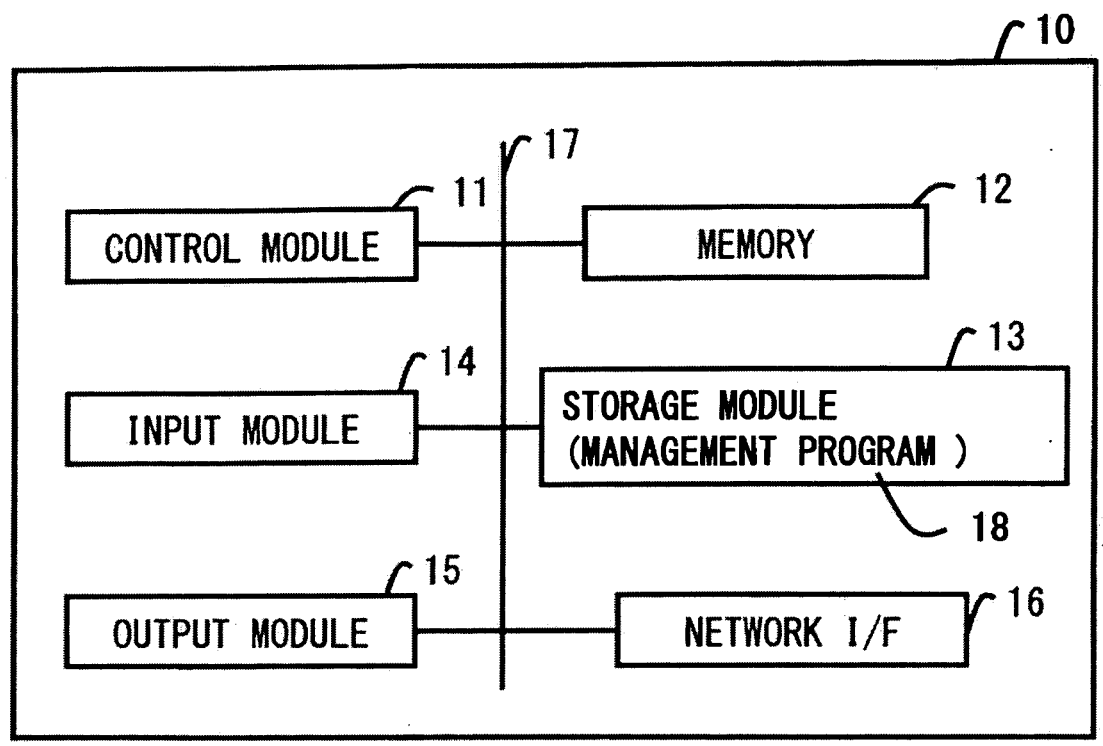
FIG. 2 is a diagram showing the hardware structure of a management computer according to the embodiment.

Next, a description will be given of the hardware structure of the management computer 10, the plurality of JOB computers 20, and the plurality of user terminals 30. FIG. 2 is a diagram showing the hardware structure of the management computer 10 according to the embodiment. The management computer 10 comprises a control unit 11, a memory 12, a storage unit 13, an input unit 14, an output unit 15, and a network interface (I/F) unit 16, and these elements are connected to a bus 17.

The control unit 11 entirely controls the management computer 10, and, e.g., a central processing unit (CPU). Further, the control unit 11 executes a management program 18 developed to the memory 12. The management program 18 allows the control unit 11 to function as a job management module 111 that receives a job program from the user terminal 30 and the processing result of the job from the processing computer 20, requests job processing to the processing computer 20, and outputs the processing result of the processing request to the user terminal 30 and a management restoring module 112 that restores job data when the management computer is abnormal.

The memory 12 is a storage region at which the management program 18 stored in the storage unit 13 is stored. Further, the memory 12 is the storage region for storing various operation results generated when the control unit 11 executes the management program 18. The memory 12 is a random access memory (RAM).

The input unit 14 receives command information from a manager, e.g., a control command in the restoration from the abnormal state of the management computer 10. The input unit 14 is, e.g., a keyboard, a mouse, or a touch panel. The output unit 15 outputs, e.g., a processing result and information indicating that the management computer 10 is abnormal. The output unit 15 is, e.g., a display (display device). The management program 18 is stored in the storage unit 13. The storage unit 13 is, e.g., a hard disk device.

The network I/F unit 16 is connected to the network 40 such as the Internet or local area network (LAN), thereby requesting the processing via the network 40 or receiving and transmitting the job. Further, the management computer 10 can be a recording medium that records the management program 18 or can download a program that records the management program 18.

Figure 3:
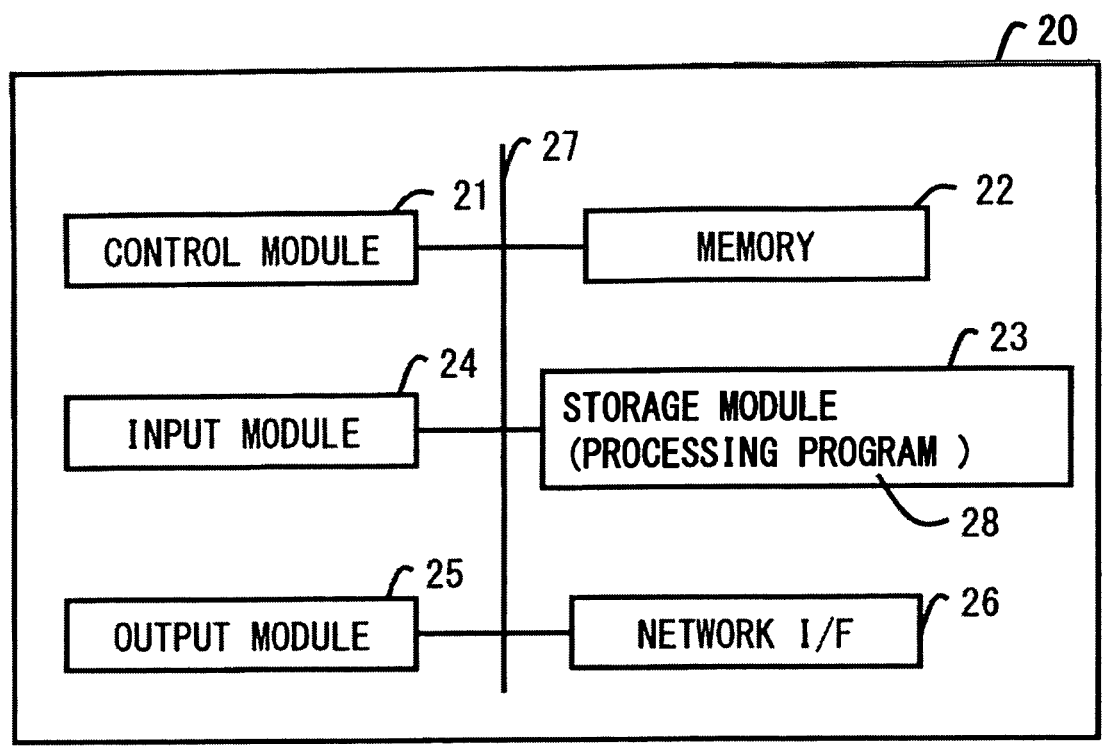
FIG. 3 is a diagram showing the hardware structure of a processing computer according to the embodiment.

FIG. 3 is a diagram showing the hardware structure of the processing computer 20 according to the embodiment. The processing computer 20 comprises a control unit 21, a memory 22, a storage unit 23, an input unit 24, an output unit 25, and a network I/F unit 26, and these elements are connected to a bus 27.

The control unit 21 entirely controls the processing computers 20 and is, e.g., a central processing unit (CPU). Further, the control unit 21 executes a processing program 28 that is developed to the memory 22. The processing program 28 allows the control unit 21 to function as a job processing module 211 that receives the job, executes operation processing of the job, and outputs the result of the operation processing of the job, and a failure restoring module 212 that transmits the processing result when the management computer 10 is abnormal and fast restores the failure of the management computer 10.

The memory 22 is a storage region at which the processing program 28 stored in the storage unit 23 is stored. Further, the memory 22 is the storage region for storing various operation results generated when the control unit 21 executes the processing program 28. The memory 22 is, e.g., a random access memory (RAM).

The input unit 24 receives a control command from a manager of the processing computer. The input unit 24 is, e.g., a keyboard, a mouse, or a touch panel. The output unit 25 outputs a processing result. The output unit 25 is, e.g., a display (display device). The processing program 28 is stored in the storage unit 23. The storage unit 23 is, e.g., a hard disk device.

The network I/F unit 26 is connected to the network 40 such as the Internet or local area network (LAN), thereby requesting the processing via the network 40 or receiving and transmitting the job. Further, the processing computer 20 can be a recording medium that records the processing program 28 or can download a program for recording the processing program 28.

Figure 4:
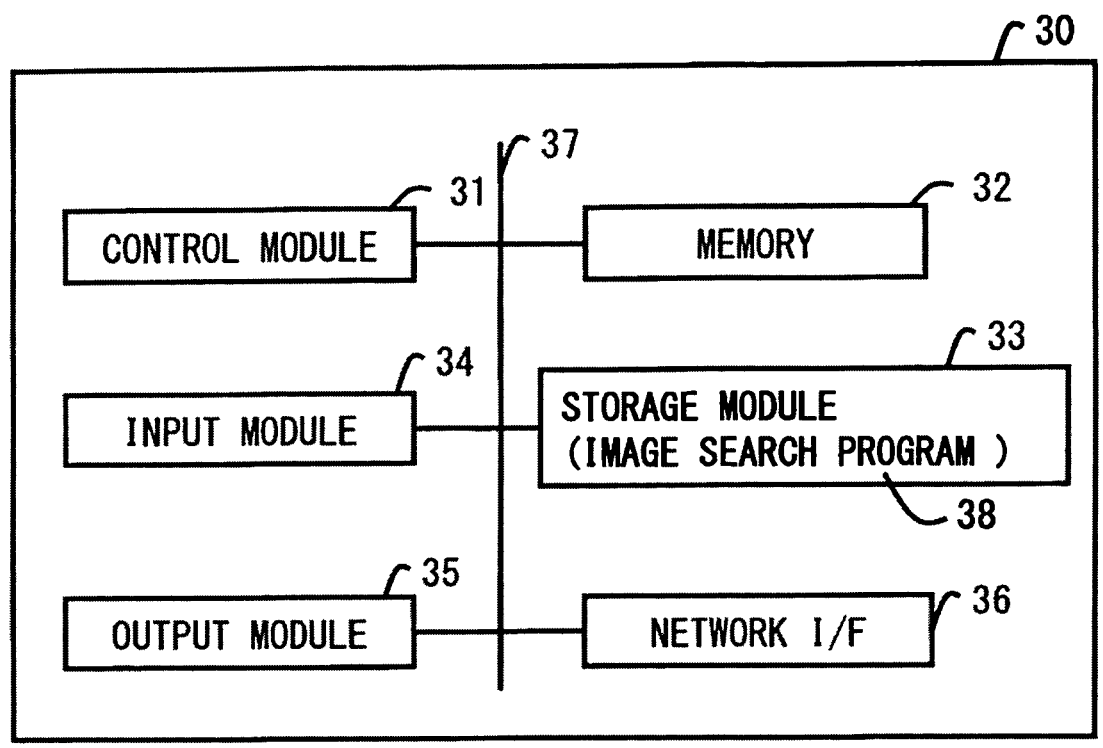
FIG. 4 is a diagram showing the hardware structure of a user terminal according to the embodiment.

FIG. 4 is a diagram showing the hardware structure of the user terminal 30 according to the embodiment. The user terminal 30 comprises a control unit 31, a memory 32, a storage unit 33, an input unit 34, an output unit 35, and a network I/F unit 36, and these elements are connected to a bus 37.

The control unit 31 entirely controls the user terminals 30 and is, e.g., a central processing unit (CPU). Further, the control unit 31 executes a user program 38 developed to the memory 32. The user program 38 allows the control unit 31 to function as a job dividing module 311 that divides the processing requests received from the user into the individual job programs, a module 312 for determining the reproducibility, which determines whether or not the job program can be the reproduced, a terminal management module 313 that manages the processing request and the job program, and a failure restoring module 314 that executes auxiliary processing of the restoration of the management computer 10.

The memory 32 is a storage region at which the user program 38 stored in the storage unit 33 is stored. Further, the memory 32 is the storage region for storing various operation results created when the control unit 31 executes the user program 38. The memory 32 is, e.g., a random access memory (RAM).

The input unit 34 receives information on the processing request from a user. The input unit 34 is, e.g., a keyboard, a mouse, or a touch panel. The output unit 35 outputs, e.g., information on the processing result of the processing request. The user program 38 is stored to the storage unit 33. The storage unit 33 is, e.g., a hard disk.

The network I/F unit 36 is connected to the network 40, such as the Internet or local area network (LAN), thereby requesting processing via the network 40 or receiving and transmitting the job. Further, the user terminal 30 can be a recording medium that records the user program 38 or can download a program that records the user program 38.

Figure 5:
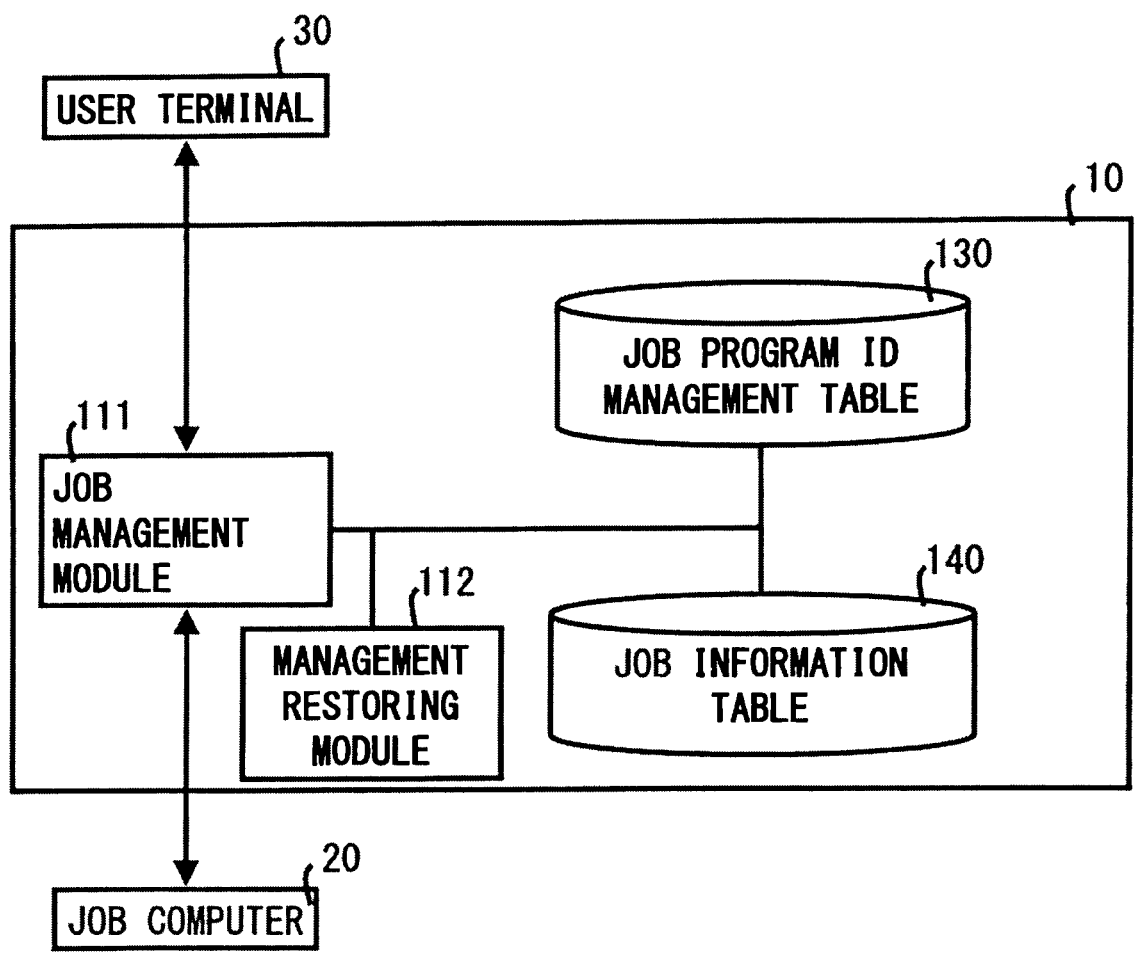
FIG. 5 is a diagram showing a functional structure of the management computer according to the embodiment.

Next, a description will be given of the functional structure of the management computer 10, the plurality of JOB computers 20, and the plurality of user terminals 30. FIG. 5 is a diagram showing the functional structure of the management computer 10.

The management computer 10 has functions of the job management module 111 and the management restoring module 112. Further, the management computer 10 has a job program ID management table 130 and a job information table 140 managing processed information.

The job program ID management table 130 and the job information table 140 are stored on the memory 12 in the management computer 10 according to the embodiment.

The job management module 111 manages the jobs. The job management module 111 executes: processing for obtaining information on the job program sent from the user terminal 30; processing for adding an identification (ID) number (No.) to the job programs; processing for storing the information on the job programs to the job program ID management table 130; processing for transmitting the information on the job program to the user terminals 30; processing for adding a job identification (ID) number (No.) to the job program and managing the job program; processing for transmitting request information on job operation processing to the processing computers 20; processing for obtaining information on the result of the job operation processing from the processing computers 20; and processing for storing information on the job processing situations of the processing computers 20 to the job information table 140.

The failure management module executes processing for restarting the management computer 10 and processing for restoring a series of job programs, created from the processing request, upon detecting the failure of the management computer 10.

Next, a description will be given of the structure of the job program ID management table 130. FIG. 6 is a diagram showing the structure of the job program ID management table 130 according to the embodiment.

The job program ID management table 130 stores information on a series of job programs corresponding to the processing request input to the user terminal 30. The job program is a unit of the processing of the operations of the individual processing computers 20. The job program ID management table 130 is included in the management computer 10. The user terminals 30 individually have a terminal job program management table 160. Incidentally, according to the embodiment, the terminal job program management table 160 of the user terminal 30 stores only information on the processing request input to the user terminal 30. Further, information on the processing requests received from the user terminals 30 is stored to the job program ID management table 130 in the management computer 10. The job program ID management table 130 is stored in the management computer 10, and the terminal job program management table 160 is stored in the user terminal 30, thereby enabling the restoration with one of the tables 130 and 160 even if losing the other table. For example, the job program ID management table 130 of the user terminal 30 is used in the restoration processing of the management computer 10. Further, the job program ID management table 130 in the management computer 10 is used in the restoration processing of the user terminal 30.

The job program ID management table 130 comprises: job program name information 131; job program ID information 132; job program storing-position information 133; information 134 indicating whether or not the reproduction is possible with respect to the result of the job operation processing; and identification (ID) number (No.) information 135 of the management computer 10.

The job program name information 131 is name information that identifies the job program. The job program ID information 132 is an identification number that is added to the jobs upon executing the job programs. The storing-position information 133 is information on the job program that specifies the position of the user terminal 30 that stores the job program. The job programs are stored to on the memory 12 in the management computer 10 and the storage unit 33 of the user terminal 30.

The information 134 indicating whether or not the reproduction is possible indicates whether or not the processing result can be reproduced when the processing computer 20 performs the operation processing of the job program. With respect to the reference as whether or not the reproduction is possible, if the processing computer 20 executes the same job program, when the processing results of the job program are similar to each other, the processing result can be reproduced. When the processing results of the job program are not necessarily similar to each other, the processing result cannot be reproduced. There are various types of the job programs. For example, the job program includes a job for calculating the operation result from a given parameter and the operation program, a job using a random number, a job for collecting the processing results of a plurality of jobs, and a job for creating a plurality of new jobs from the result of the job. Therefore, the job includes a job with the same operation result and a job without the same operation result.

The identifier information of the management computer 10 is an identification number that specifies the management computer 10 when there are a plurality of the management computers 10. The identifier information of the management computer 10 is added to the management computer 10 in advance. The identifier information of the management computer 10 is used to restore the management computer 10, when the management computer 10 is abnormally operated.

Next, a description will be given of the structure of the job information table 140. FIG. 7 is a diagram showing an example of the structure of the job information table 140 according to the embodiment. The management computer 10 has the job information table 140. The job information table 140 stores the states of the individual job programs.

The job information table 140 comprises job ID information 141, job processing-contents information 142, processing computer information 143, job processing-situation information 144, job-link information 145, job-priority information 146, and job processing result information 147.

The job ID information 141 is an identification number that is added to the job programs divided for the user terminals 30. The job ID information 141 is added when the management computer 10 allows the processing computer 20 to execute the job.

The job processing-contents information 142 is information on a module that is read upon executing the job program. For example, the job processing-contents information 142 includes information such as a library function used for the job operation processing.

The processing computer information 143 is information on the processing computer 20 that processes the job program. The management computer grasps the processing performance of the processing computers 20 in advance. Upon requesting the job operation to the processing computer 20, the processing computer information 143 is divided depending on the processing performance of the processing computer 20. For example, upon transmitting the request of the job operation, the management computer 10 transmits a request of the job operation to the processing computer 20 that is predicted with the shortest time for obtaining the job processing result in the distributed processing system 1.

The job processing-situation information 144 is a situation of the processing of the latest job grasped by the management computer 10. For example, the processing-situation information 144 stores information on the request date of the job, information on the elapse time after sending the request of the job operation, and information on the obtaining date and time of the job operation result. The job-link information 145 stores a relationship with another job program. For example, the job-link information 145 stores job IDs of before-and-after jobs. The job-priority information 146 stores priority information of the job processing. The priority information is classified depending on as whether or not the job is one to be operated in advance. For example, upon inputting the processing request to the user terminal 30, the user registers the priority information of the job programs. The job with high priority is, e.g., a job whose processing result is used by another job.

The job processing result information 147 is data on the result of the job operation processing. The processing computer 20 transmits the result of the job operation processing to the management computer 10. The management computer stores the processing result to a corresponding record in the job information table 140.

Figure 8:
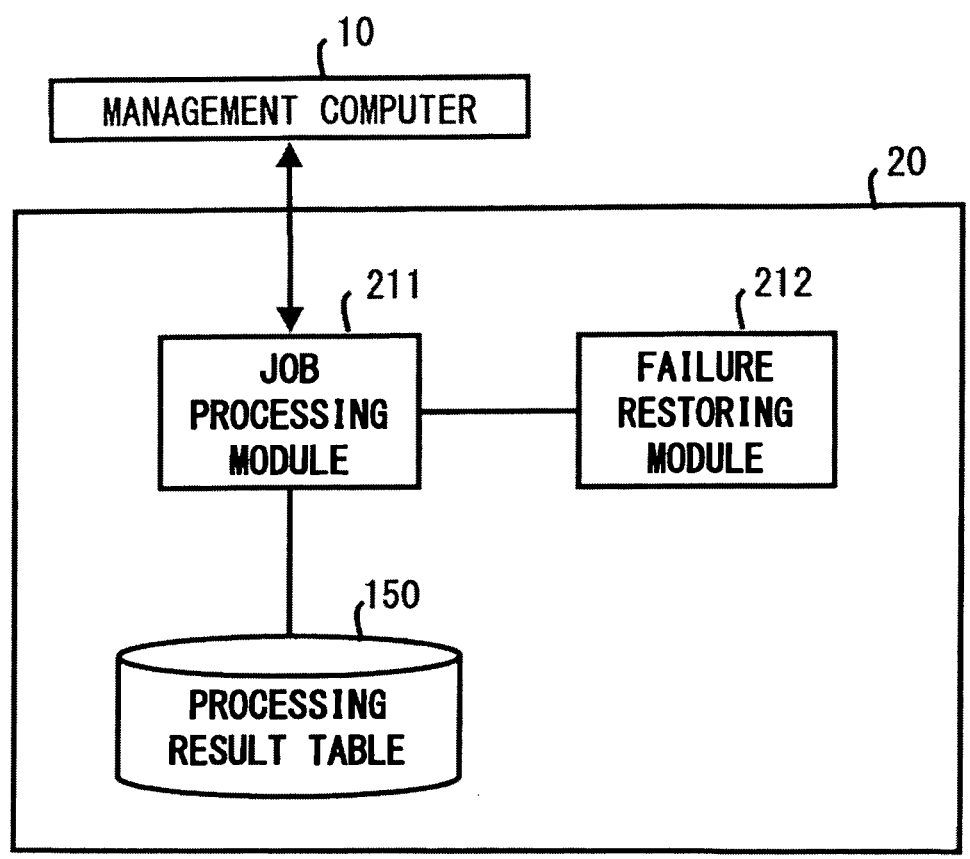
FIG. 8 is a functional block diagram showing the processing computer according to the embodiment.

Next, a description will be given of the functional structure of the processing computer 20. FIG. 8 is a functional block diagram of the processing computer 20 according to the embodiment.

The processing computer 20 has functions of the job processing module 211 and the failure restoring module 212.

Further, the processing computer 20 includes a processing result table 150. The processing result table 150 is stored on the storage unit 23 in the processing computer 20 according to the embodiment.

The job processing module 211 processes the job. The job processing module 211 executes: processing for operating information on the processing request of the job sent from the management computer 10; processing for transmitting the information on the result of the job operation processing to the management computer 10; and processing for correlating the processing result with the information on the processing request of the job and storing the resultant information to the processing result table 150.

The failure restoring module 212 has a function for transmitting contents of the processing result table 150 to the management computer 10 in accordance with an instruction upon detecting a failure of the management computer 10.

Herein, a description will be given of processing result table 150. FIG. 9 is a diagram showing an example of the structure of the processing result table 150. The processing result table 150 stores information on the jobs that are received and operated by the processing computers 20. The processing result table 150 is included in the processing computer 20. The processing result table 150 stores: job program ID information 151; job ID information 152; identifier information 153 of the management computer; job start/end time information 154; and processing result information 155.

The job program ID information 151 is an identification number added to the job program, and is the same as the job program ID information 132 in the job program ID management table 130. The job ID information 152 is an identification (ID) number (No.) added to each job upon executing the job program, and is the same as the job program ID information 132 in the job program ID management table 130. The identifier information 153 of the management computer is an identification (ID) number (No.) for specifying the management computer 10, when there are a plurality of the management computers 10, and is the same as the identification number information 135 of the management computer in the job program ID management table 130.

The job start/end time information 154 includes: information on the date and time when the processing computer 20 receives the job information; and information on the date and time when the processing computer 20 transmits the result of executing the job operation processing to the management computer 10. The processing result information 155 includes information on the result of the job operation processing.

Figure 10:
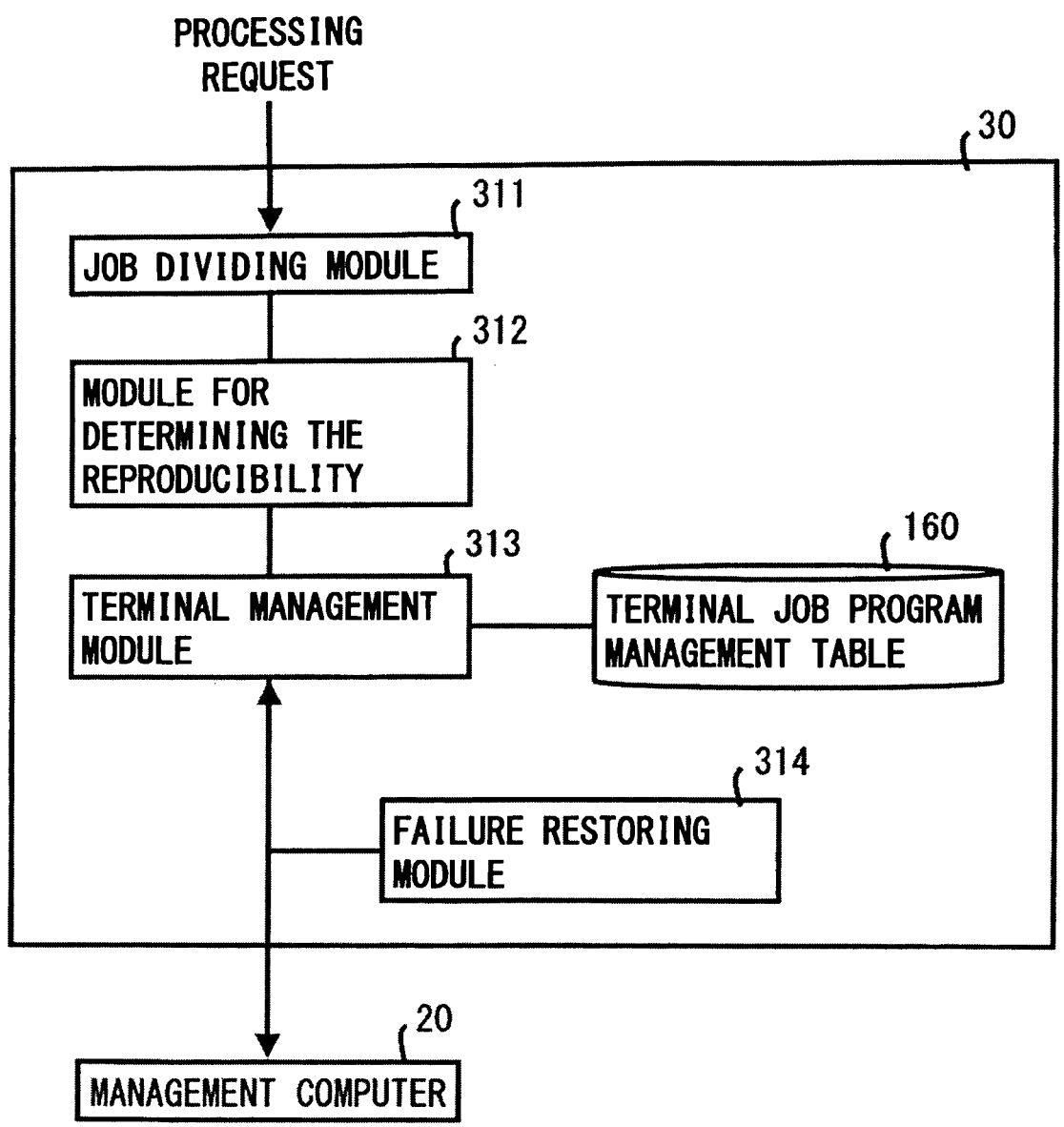
FIG. 10 is a diagram showing an example of the structure of the user terminal according to the embodiment.

Next, a description will be given of the functional structure of the user terminal 30. FIG. 10 is a diagram showing an example of the structure of the user terminal 30.

The user terminal 30 has functions of the job dividing module 311, the module 312 for determining the reproducibility, the terminal management module 313, and the failure restoring module 314.

The job dividing module 311 divides the processing requests input by the user into the job program. The module 312 for determining the reproducibility determines whether or not the operation processing of the individual divided job programs can be reproduced. The terminal management module 313 has a function for ensuring the data matching between the user terminal 30 and the management computer 10. For example, the terminal management module 313 ensures the data matching between the record stored in the terminal job program management table 160 and the job program ID management table 130.

The failure restoring module 314 executes processing for assisting the restoration of the management computer 10, when the management computer 10 is abnormally operated and the state of the management computer 10 is restored. For example, the record stored in the terminal job program management table 160 is transmitted to the management computer 10.

Further, the user terminal 30 has the terminal job program management table 160.

The terminal job program management table 160 is stored to the storage unit 33 of the user terminal 30 according to the embodiment.

The terminal job program management table 160 stores a record on the processing request of the user terminal 30 thereof. Incidentally, items in the column of the records stored in the terminal job program management table 160 are the same data items in the column of the records in the job program ID management table 130 and a description thereof is thus omitted.

Figure 11:
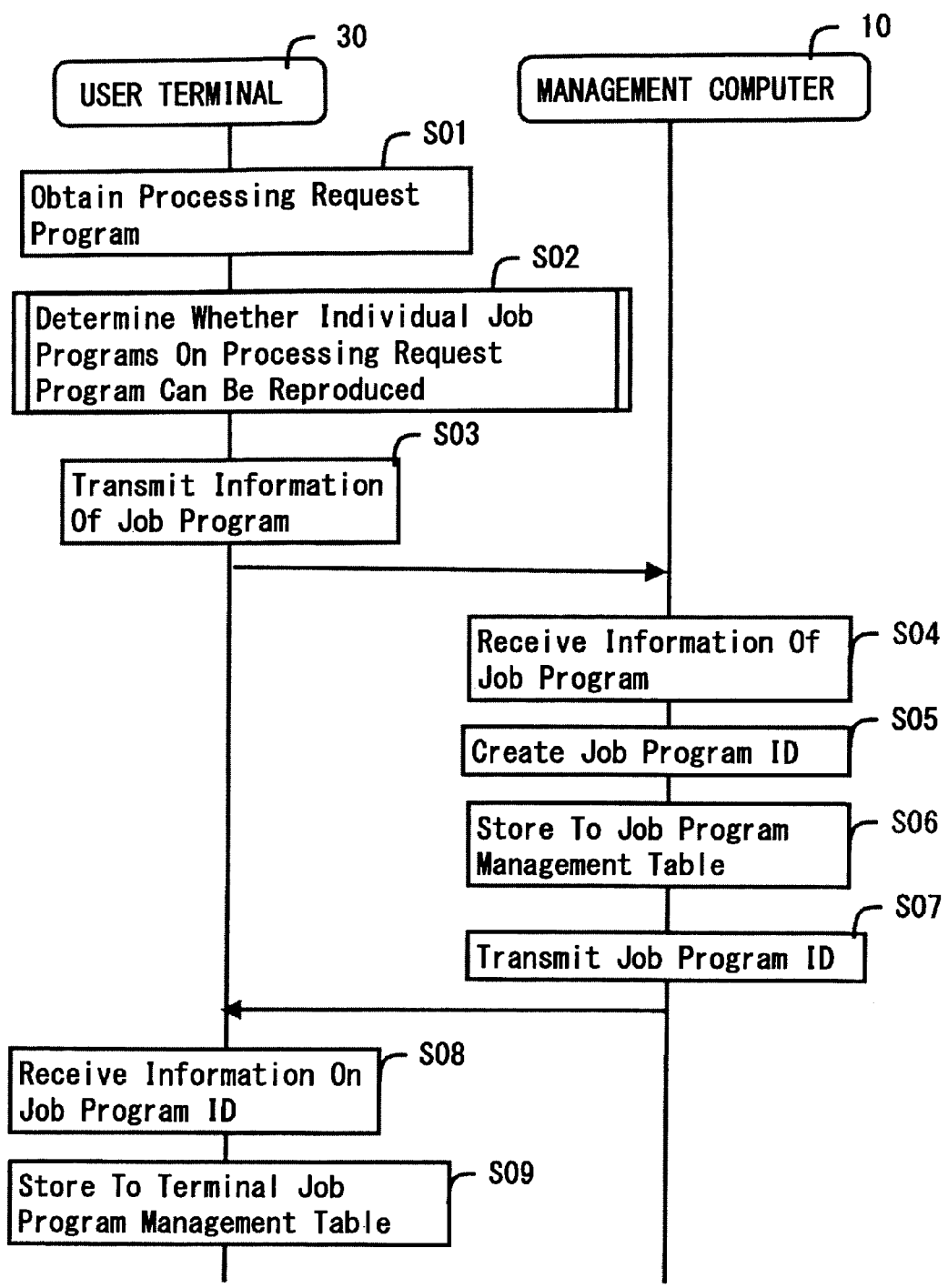
FIG. 11 is a flowchart of processing upon registering job information according to the embodiment.

Next, a description will be given of a processing flow at the normal time in the distributed processing system 1. FIG. 11 is a flowchart of processing upon registering the job information. A user registers a processing request program for operation of the distributed processing system 1 to the user terminal 30. According to the embodiment, the processing request program divided into a proper job program in advance is set. The user terminal 30 obtains the processing request program (in step S01). Subsequently, the user terminal 30 determines whether the individual job programs on the processing request program can be reproduced (in step S02).

Figure 12:
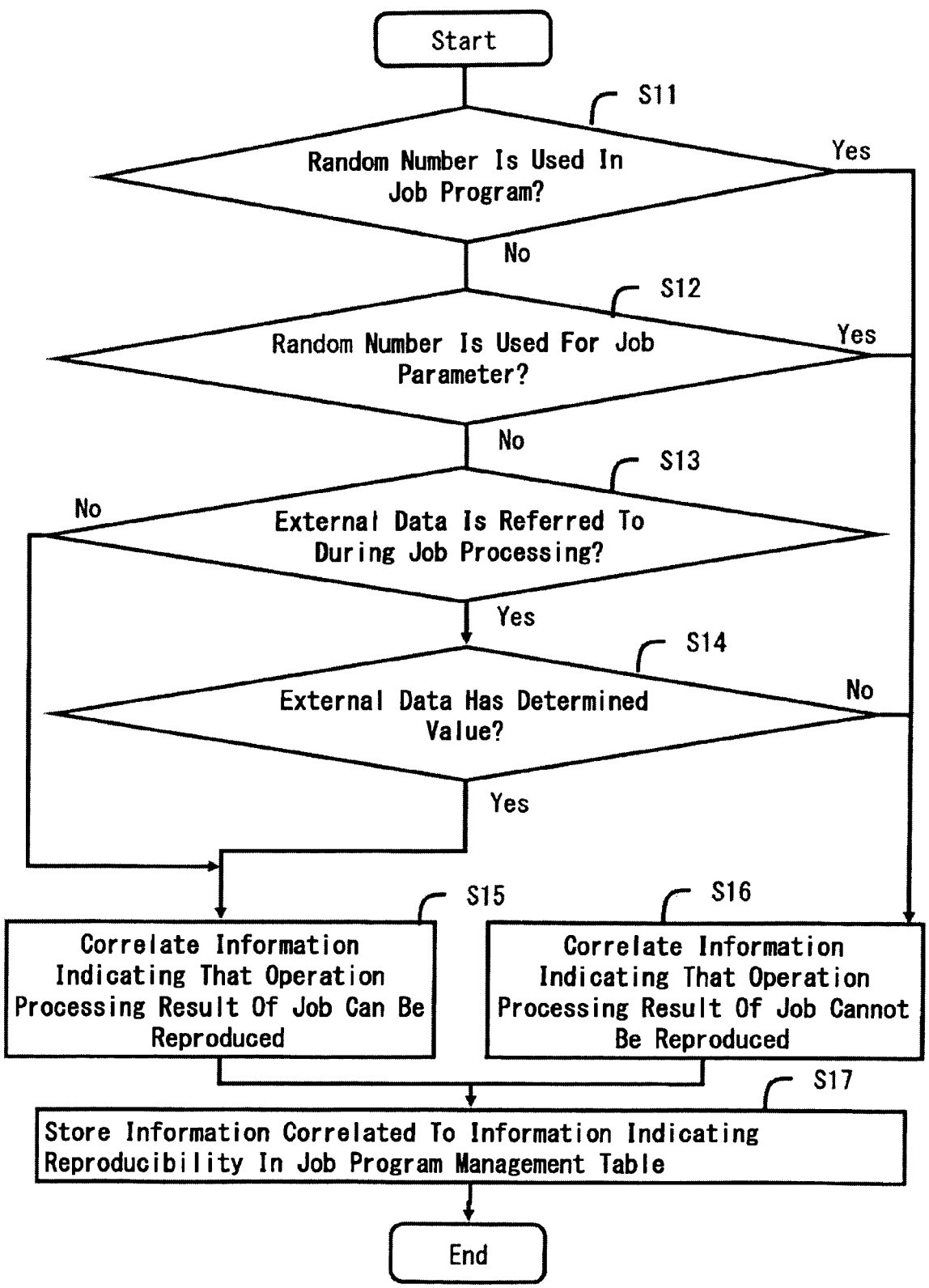
FIG. 12 is a flowchart of processing for determining whether the reproducibility is present or not according to the embodiment.

Herein, a description will be given of processing for determining the reproducibility, executed by the user terminal 30, in step S02 of FIG. 11. FIG. 12 is a flowchart showing the processing for determining the reproducibility. The control unit 31 in the user terminal 30 determines the reproducibility every job program.

First, the control unit 31 in the user terminal 30 determines whether or not a random number is used in the job program (in step S11). When it is determined that the random number is used (Yes in step S11), the control unit 31 determines that the job program cannot be reproduced. On the other hand, when it is determined that the random number is not used (No in step S11), the control unit 31 determines whether or not the random number is used for a job parameter (in step S12). The job parameter is an input value for setting to the job.

When it is determined that the random number is used for the job parameter (Yes in step S12), the control unit 31 determines that the job program cannot be reproduced. On the other hand, when it is determined that the random number is not used for the job parameter (No in step S12), the control unit 31 determines whether or not external data is referred to during the job processing (in step S13). The external data is a value of another result of the job operation processing.

When the control unit 31 determines that the external data is not referred to (No in step S13), the control unit 31 determines that the job processing result can be reproduced. On the other hand, when the control unit 31 determines that the external data is referred to (Yes in step S13), the control unit 31 determines whether or not the external data has a determined value. With respect to the determination as whether or not the external data has a determined value, e.g., when it is determined that a job for outputting the external data can be reproduced, it is determined that the external data has a determined value.

The control unit 31 uses a tree diagram of the job structure, thereby obtaining the information on the reproducibility of the job for outputting the external data and determining the information. Incidentally, when it is not obvious that the external data has a determined value, the output unit 35 of the user terminal 30 may display the this fact together with the job program. In this case, the user determines whether or not the external data referred to by the job program displayed on the output unit 25 has a determined value and inputs the determination result to the input unit 34. The control unit 31 of the user terminal 30 registers the obtained determination result.

When it is determined the external data has a determined value (Yes in step S14), the control unit 31 determines that the operation processing result of the job can be reproduced. On the other hand, when it is determined that the external data does not have a determined value (No in step S14), the control unit 31 determines that the operation processing result of the job cannot be reproduced. The control unit 31 correlates information indicating that the operation processing result of the job can be reproduced with the job program that can be reproduced (in step S15), and further correlates information indicating that the operation processing result of the job cannot be reproduced with the job program that it is determined that it is not obvious that the job program can be reproduced (in step S16). The control unit 31 stores the information correlated in step S15 or S16 to information 164 indicating the reproducibility in the job program management table 160 (in step S17).

With the above operation, the control unit 31 of the user terminal 30 obtains the information indicating whether or not each job program can be reproduced. The description is back to that of the flowchart shown in FIG. 11. Next, a description will be given of registering data to the job program ID management table 130 in the management computer 10 and to the terminal job program management table 160 of the user terminal 30. The user terminal 30 transmits information on the job program name, information indicating the reproducibility, and storage position information of the job program to the management computer 10 (in step S03).

The management computer 10 receives the information on the job program name transmitted by the user terminal 30, the information indicating the reproducibility, and the information on the storage position of the job program (in step S04). The management computer 10 creates a job program ID every information on the job program name (in step S05). The management computer 10 stores, to the job program ID management table 130 in the management computer 10, the job program name information 131, the job program ID information 132, the job program storing-position information 133, the information 134 indicating whether or not the result of the job operation processing can be reproduced, and the identifier information 135 of the management computer (in step S06). The management computer 10 transmits, to the user terminal 30, the information on the job program ID added in step S05 and the identifier information on the management computer (in step S07).

The user terminal 30 receives the information on the job program ID and the identifier information on the management computer transmitted by the management computer 10 in step S07 (in step S08), the user terminal 30 stores job program name information 161, job program ID information 162, job program storage-position information 163, the information 164 indicating the reproducibility, and management-computer identifier information 165 to the terminal job program management table 160 of the user terminal 30 (in step S09).

With the above operation, with respect to the processing request input to the user terminal 30, the data matching is kept between the job program ID management table 130 in the management computer 10 and the terminal job program management table 160 of the user terminal 30.

Figure 13:
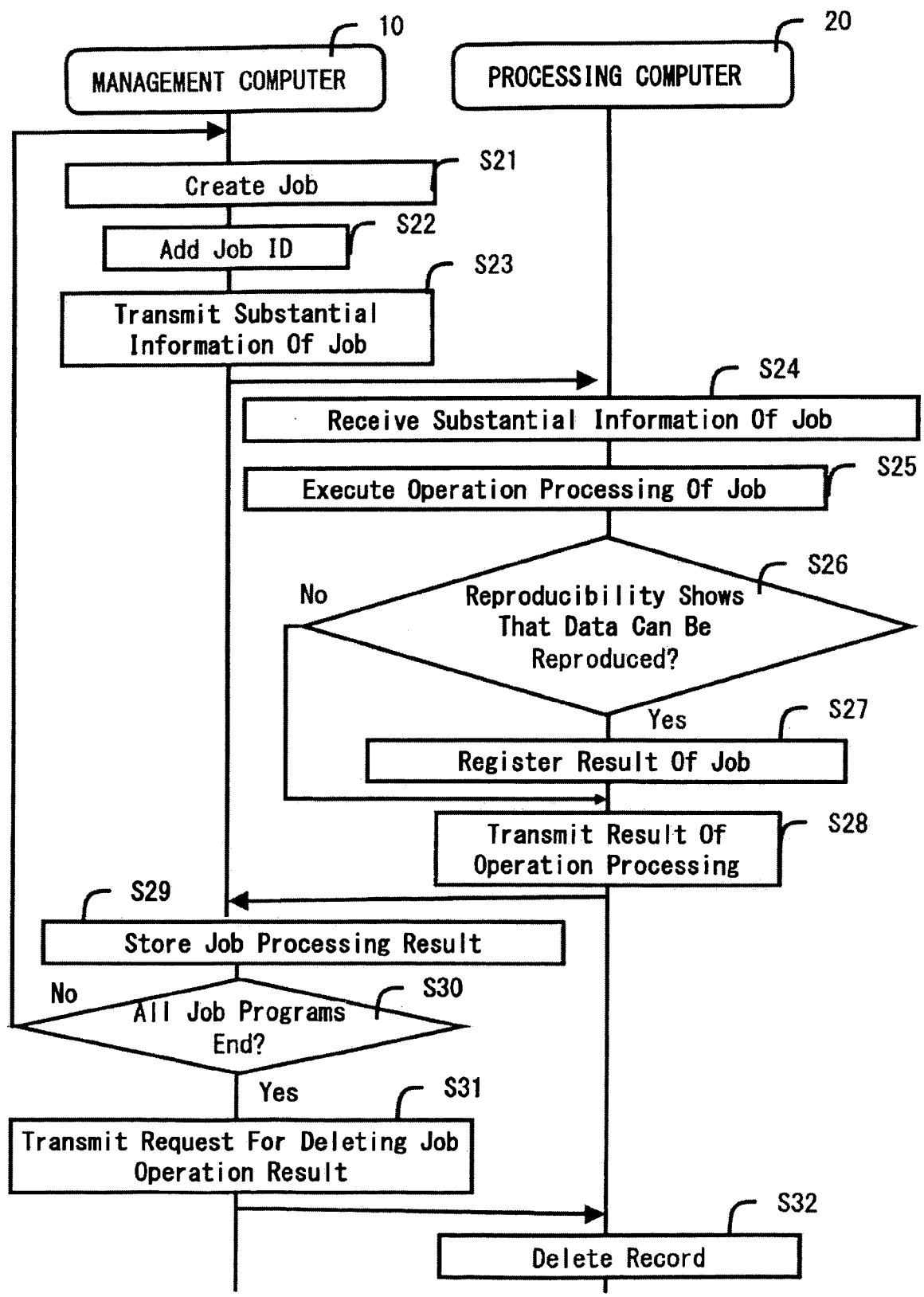
FIG. 13 is a flowchart of processing in which the management computer allows the processing computer to execute a job according to the embodiment.

Next, a description will be given of the distributed processing between the management computer 10 and the processing computer 20. FIG. 13 is a flowchart of processing in which the management computer 10 allows the processing computer 20 to execute the job. The management computer 10 creates the job executed by the processing computer 20 from the job program (in step S21). The job according to the embodiment is an actual operation target corresponding to the job program. The management computer 10 adds an identifier (job ID) for identifying the job every created job (in step S22). Further, the management computer 10 stores the job ID created in step S21 to the job ID information 141 on the record of the job information table 140, further stores a job link to the link information 145, and furthermore stores the priority of the job to the priority information 146.

The management computer 10 transmits substantial information of the job, the job program name, the job ID, the management computer identifier, and the information indicating the reproducibility to the processing computer 20 (in step S23). In step S23, the management computer 10 specifies the processing computer 20 as the sending destination of the job processing. For example, the management computer 10 specifies the processing computer 20 by the following sequence. The management computer 10 grasps in advance the processing performance of the processing computer 20. The management computer 10 compares the processing capacity of the processing computer 20 with the amount of processing of the job program, thereby specifying a proper one of the processing computers 20. Alternatively, the management computer 10 searches and specifies the processing computer 20 with the shortest operation time. Further, the management computer 10 stores information on the processing computer that requests the processing of the job ID created in step S21 to the processing computer information 143. Furthermore, the management computer 10 stores processing contents of the job corresponding to the processing computer 20 to which the processing is requested to the job processing-contents information 142. In addition, the management computer 10 sets the job processing-situation information 144 indicating the processing is being requested, and stores the job processing-situation information 144 to the job information table 140.

The processing computer 20 receives the substantial information of the job sent by the management computer 10, the job program ID, the job ID, the identifier of the management computer 10, and the information indicating that the reproducibility (in step S24).

The processing computer 20 executes the operation processing of the received job (in step S25).

The processing computer 20 determines whether or not the received information indicating the reproducibility shows that data can be reproduced (in step S26). According to the embodiment, only when the result of the job operation processing can be reproduced, it is registered. With the structure, only the processing result of the reproducible job is stored to the storage unit in the processing computer 20. As a consequence, a region for storing the processing result of the job in the storage unit 23 in the processing computer may be smaller than the region upon storing all the processing results of the jobs. On the other hand, the processing result of the job that cannot be reproduced is not used for the restoration of the management computer 10, which will be described later, and this does not need to be stored.

If it is determined that the information indicating the reproducibility shows that the data can be reproduced (Yes in step S26), the processing computer 20 registers the result of the job operation processing to the processing result table 150 (in step S27). Specifically, the processing computer 20 stores, to the job information table 140, the job program name information 151 received in step S24, the job ID information 152 received in step S24, the identifier information 153 of the management computer received in step S24, the start time/end time information 154 of the job operation processing in step S25, and the processing result information 155 of the job operation processing in step S25. The processing computer 20 transmits the result of the operation processing to the management computer 10 (in step S28).

Upon receiving the operation result of the job from the processing computer 20, the management computer 10 stores the job processing result information 147 to the record matching the job ID information 141 in the job information table 140 (in step S29). Further, the processing situation 144 of the management computer 10 in the job information table 140 is set as the processing end.

Until ending the processing of all the job programs corresponding to the processing request (No in step S30), the management computer 10 allows the processing computer 20 to execute the job operation processing. On the other hand, if ending the processing of all the job programs, (Yes in step S30), the management computer 10 transmits a request for deleting the job operation result to the processing computers 20 together with the program ID (in step S31). The processing computer 20 that receives the command for deletion from the management computer 10 deletes the record matching the program ID in the processing result table 150 (in step S32).

With the above structure, the management computer 10 allows the plurality of JOB computers 20 to execute the job, thereby obtaining the processing result of the processing request.

Next, a description will be given of processing of the distributed processing system 1 when a failure is caused in the management computer 10. If causing a failure in the management computer 10, data on the memory 12 can be lost. FIG. 14 is a flowchart of processing for restoring the data on the processing request on the memory 12 in the management computer 10.

The control unit 11 in the management computer 10 executes the management restoring module 112 (in step S41).

Subsequently, the control unit 11 in the management computer 10 restores a function necessary for the processing of the management computer 10 (in step S42). The function necessary for the management computer 10 includes, e.g., the start of OS of the management computer 10 and the setting of the identifier of the network 40 in the management computer 10. Subsequently, the management computer 10 performs the restoration of the processing request with the following processing.

According to the embodiment, the processing computer 20, the user terminal 30, and the management computer 10 check the operation of partners every predetermined time. For example, Transmission Control protocol/Internet Protocol (TCP/IP protocol) serving as a standard program on the Internet executes, every predetermined time, processing for checking whether or not a designated IP address is connected to a network, such as Packet INternet Groper (ping command). While the management computer 10 is restored by the processing in step S42, the processing computer 20 or the user terminal 30 does not detect the management computer 10 on the network 40. If the processing computer 20 or the user terminal 30 does not detect the management computer 10 on the network 40, it is determined that the management computer 10 is abnormally operated (in steps S43 and S44).

The user terminal 30 transmits, to the management computer 10, information indicating that the information stored in the terminal job program management table 160 can be sent to the management computer 10 every predetermined time (in step S45). Incidentally, the identifier of management computer 10 that is abnormally operated is included in the column of the management-computer identifier 165 in the terminal job program table 160 in the user terminal 30 that sends the information to the management computer 10 in step S45.

The processing computer 20 transmits, to the management computer 10, information indicating that the information on the processing result in the processing result table 150 can be sent to the management computer 10 every predetermined time (in step S46). Incidentally, the identifier of management computer 10 that is abnormally operated is included in the column of the management computer identifier 153 in the processing result table 150 of the processing computer 20 that sends the information to the management computer 10 in step S46.

The management computer 10 receives, for a predetermined time, information indicating that the processing result information in the processing result table 150 from the processing computer 20 can be transmitted to the management computer 10, and information indicating that the information stored in the terminal job program management table 160 from the user terminal 30 can be transmitted to the management computer 10. If a protocol time or more passes, the user terminal 30 or the processing computer 20 does not exist on the network 40 with high possibility. The predetermined time may be set in accordance with a predetermined time interval for issuing the ping command by the user terminal 30 and the processing computer 10.

The management computer 10 transmits, to the user terminals 30, information indicating the information stored in the management table of the user terminal 30 can be obtained (in step S47). The user terminal 30 receives the information indicating the information stored in the terminal job program management table 160 of the user terminal 30 can be obtained from the management computer 10, and then transmits the information stored in the terminal job program management table 160 of the user terminal 30 to the management computer 10 (in step S48).

Further, the management computer 10 transmits, to the processing computer 20, information indicating that the processing result information of the processing result table 150 in the processing computer 20 can be obtained (in step S47). The processing computer 20 receives, from the management computer 10, the information indicating that the processing result information of the processing result table 150 in the processing computer 20 can be obtained, and then transmits the processing result information to the management computer 10 (in step S49).

The management computer forms the job program ID management table 130 on the memory 12 with the terminal job program management table 160 received from the user terminal 30 (in step S50). Further, the management computer 10 specifies the corresponding record of the job program ID management table 130 from the job program ID information 151 in the processing result table 150 transmitted from the processing computer 20.

Figure 15A:
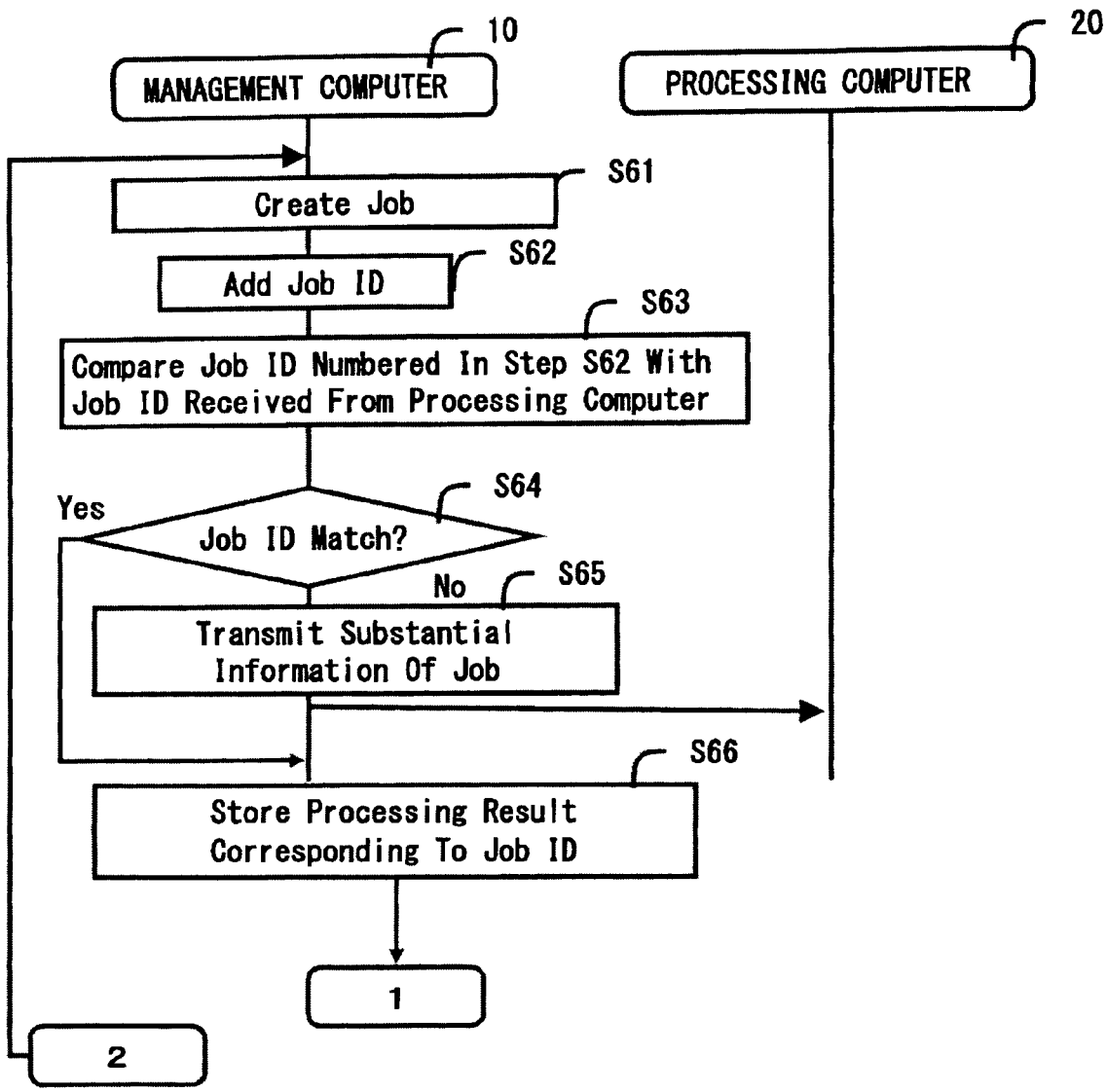
FIG. 15A and FIG. 15B are flowchart of the subsequent processing for restoring the data on the processing request on the memory in the management computer according to the embodiment.
Figure 15B:
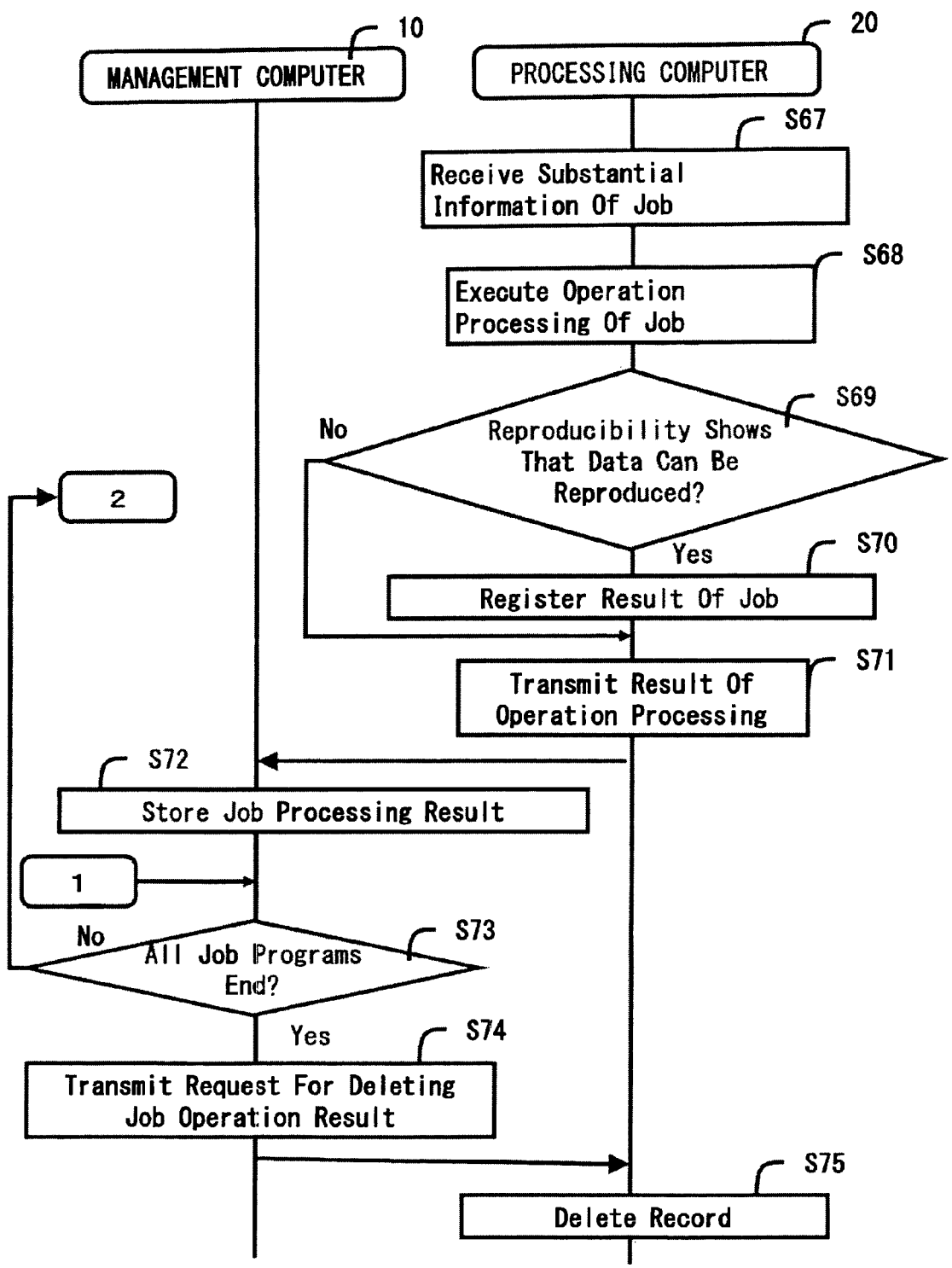

Next, the job restoration processing will be described. FIG. 15A and FIG. 15B are continuous flowchart of the processing for restoring the data on the processing request on the memory 12 in the management computer 10. The management computer 10 executes the processing again from the head of the jobs. Since the processing is executed from the head of the jobs, the restoration is possible even if the structure of the distributed processing system 1 is different between the time of the normal processing and the time of the occurrence of the failure.

The management computer 10 creates a job to be executed by the processing computer 20 from the job program (in step S61). The job according to the embodiment is an actual operation target corresponding to the job program. The management computer 10 adds the job IDs to the created jobs (in step S62).

Subsequently, the management computer 10 compares the job ID numbered in step S62 with the job ID received from the processing computer 20 in step S49 (in step S63). The management computer 10 determines whether or not the created job ID matches the created job ID obtained from the processing computer 20 (in step S64).

If it is determined that the created job ID matches the created job ID (Yes in step S64), the management computer 10 stores, to the job information table 140, the processing result corresponding to the job ID obtained from the processing computer 20 in step S49 (in step S66). On the other hand, if it is determined that the created job ID does not match the created job ID (No in step S64), the management computer 10 transmits the processing request to the processing computer 20 (in step S65).

The processing computer 20 receives the substantial information of the job transmitted by the management computer 10, the job program ID, the job ID, the identifier of the management computer 10, and the information indicating the reproducibility (in step S67). The processing computer 20 executes the operation processing of the received job (in step S68). The processing computer 20 determines whether or not the received information indicating the reproducibility shows that data can be reproduced (in step S69). If it is determined that the information indicating the reproducibility shows that the data can be reproduced (Yes in step S69), the processing computer 20 registers the result of the job operation processing to the processing result table 150 (in step S70). The processing computer 20 transmits the result of the operation processing to the management computer 10 (in step S71).

The management computer 10 receives the result of the operation of the job from the processing computer 20, and then stores the job processing result information 147 to the record the job ID information 141 in the job information table 140 matches (in step S72). Further, the management computer 10 in the job information table 140 sets the processing situation 144 as the processing end.

Until ending the processing of all the job programs corresponding to the processing request (No in step S73), the management computer 10 allows the processing computer 20 to execute the operation processing of the job. On the other hand, if ending all the jobs (Yes in step S73), the management computer 10 transmits, to the processing computers 20, a request for deleting the operation result of the job together with the program ID (in step S74). The processing computer 20 that receives the command for deletion from the management computer 10 deletes the record having the matching program ID in the processing result table 150 (in step S75).

With the above processing, the management computer 10 can restore the job processing situation.

The distributed processing system 1 according to the embodiment stores the information on the job processing to the processing computer 20 and the user terminal 30. In the restoration processing of the failure of the management computer 10, the contents of the processing result table in the processing computers 20 are transferred to the management computer 10. If there is the processing result transferred from the processing computer 20, the management computer 10 does not issue the processing request of the job to the processing computer 20, and uses the processing result transferred from the processing computer 20, thereby reducing the job processing in the restoration. As a consequence, the distributed processing system 1 can efficiently perform the restoration of the job processing and the management computer 10 can be restored without a redundant structure. Therefore, it is possible to reduce introduction costs and operation costs required by the management computer 10 in the distributed processing system 1.

What is claimed is:

1. A method for controlling a distributed processing system comprising a user terminal and a management computer for managing distributed processing of a job program including a plurality of processing requests and a plurality of execution computers for executing the job program, comprising:
    a) dividing the plurality of processing requests into a plurality of job programs by the user terminal;
    b) determining, by the user terminal, operation processing data parameters in which one of the parameters describes whether or not said plurality of job programs can be reproduced;
    c) storing, by the management computer, in a first table, said operation processing data parameter;
    d) generating, by the management computer, a second table indicating associated identifiers with the plurality of job programs;
    e) assigning, by the management computer, the plurality of job programs for execution to execution computers;
    f) determining, by at least one of the execution computers, that the management computer is abnormally operated;
    g) transmitting, by said execution computers, an executed plurality of job programs;
    h) determining, by the management computer, a restoration process by matching identifiers from the plurality of job programs in step d) to the executed plurality of job programs in step g); and
    i) sending, by the management computer, a job program execution request to execution computers based on jobs not matching.

2. The method according to claim 1, further comprising, detecting error information indicating an occurrence of an error in said management computer by one of said execution computers, and
    transferring information capable of sending said processed information to said management computer from said one of said execution computers when said execution computer detects said error information.

3. The method according to claim 1, further comprising, transferring deletion information instructing deletion of said processed information stored in one of said plurality of execution computers by said management computer to each of said execution computers, and
    deleting said processed information stored in each said execution computers upon receipt of said deletion information.

4. The method according to claim 1, further comprising, determining whether said processed information is available or not on the basis of whether one of said execution computers uses information executed by another job.

5. The method according to claim 1, further comprising, determining whether said processed information is available or not on the basis of whether one of said execution computers uses a random number.

6. A system for distributed processing, comprising:
    a user terminal for operation by a user; a management computer for managing distributed processing of a job program including a plurality of processing requests; and
    a plurality of execution computers for executing the job program, said system processing according to a process comprising,
    a) dividing the plurality of processing requests into a plurality of job programs by the user terminal;
    b) determining operation processing data parameters in which one of the parameters describes whether or not said plurality of job programs can be reproduced by the user terminal;
    c) storing, by the management computer, in a first table, said operation processing data parameters;
    d) generating, by the management computer, a second table indicating associated identifiers with the plurality of job programs;
    e) assigning, by the management computer, the plurality of job programs for execution to execution computers;
    f) determining, by at least one of the execution computers, that the management computer is abnormally operated;
    g) transmitting, by said execution computers, an executed plurality of job programs;
    h) determining, by the management computer, a restoration process by matching identifiers from the plurality of job programs in step d) to the executed plurality of job programs in step g); and
    i) sending, by the management computer, a job program execution request to execution computers based on jobs not matching.

7. The system execution computer according further to claim 6, wherein one of said execution computers further detects error information indicating an occurrence of an error in said management computer, and
    said execution computer further transfers information capable of sending said processed information to said management computer when said execution computer detects said error information.

8. The system according to claim 6, wherein said management computer further transfers deletion information instructing deletion said processed information stored in said execution computer to each of said execution computers, and
    each said execution computer deletes said processed information stored in said execution computer upon receipt of said deletion information.

9. The system according to claim 6, wherein one of said execution computers further determines whether said processed information is available or not on the basis of whether said one of said execution computers uses information executed by another job.

10. The method according to claim 6, wherein one of said execution computers further determines whether said processed information is available or not on the basis of whether said one of said execution computers uses a random number.

11. A non-transitory, computer readable storage medium storing a program for controlling a distributed processing system comprising a user terminal and a management computer for managing distributed processing of a job program including a plurality of processing requests and a plurality of execution computers for executing a plurality of jobs, said program according to a process comprising:
    a) dividing the plurality of processing requests into a plurality of job programs by the user terminal;

b) determining, by the user terminal, operation processing data parameters in which one of the parameters describes whether or not said plurality of job programs can be reproduced;
c) storing, by the management computer, in a first table, said operation processing data parameters;
d) generating, by the management computer, a second table indicating associated identifiers with the plurality of job programs;
e) assigning, by the management computer, each of the plurality of job programs for execution to execution computers;
f) determining, by at least one of the execution computers, that the management computer is abnormally operated;
g) transmitting, by said execution computers, an executed plurality of job programs;
h) determining, by the management computer, a restoration process by matching identifiers from the plurality of job programs in step d) to the executed plurality of job programs in step g);
i) sending, by the management computer, a job program execution request to execution computers based on jobs not matching.

\* \* \* \* \*